United States Patent [19]

Rupprecht et al.

[11] 4,008,544
[45] Feb. 22, 1977

[54] PLASTIC PLANTING CONTAINER

[75] Inventors: Walter E. F. Rupprecht; Eckel R. Lane; Joseph W. Rakshys, Jr., all of Midland, Mich.

[73] Assignee: The Dow Chemical Company, Midland, Mich.

[22] Filed: Sept. 8, 1975

[21] Appl. No.: 611,287

[52] U.S. Cl. .................................... 47/77; 47/86; 220/DIG. 30; 260/DIG. 43; 428/500; 260/23 R
[51] Int. Cl.² .......................................... A01G 9/02
[58] Field of Search .......... 47/34, 37; 260/DIG. 43, 260/23 R; 220/DIG. 30; 111/96, 4; 428/500

[56] References Cited

UNITED STATES PATENTS

| 1,959,139 | 5/1934 | Otwell | 47/37 |
|---|---|---|---|
| 2,219,870 | 10/1940 | Jacobus | 47/34 |
| 2,688,209 | 9/1954 | Adams | 47/37 |
| 3,184,890 | 5/1965 | McKey | 47/37 |
| 3,517,629 | 6/1970 | Bridges et al. | 111/96 |
| 3,683,549 | 8/1972 | Simmon | 47/34 |
| 3,736,889 | 6/1973 | Reid | 47/37 X |
| 3,755,962 | 9/1973 | Walters et al. | 47/34 |
| 3,797,690 | 3/1974 | Taylor et al. | 220/1 R |
| 3,798,837 | 3/1974 | Oehmke et al. | 47/37 |
| 3,844,987 | 10/1974 | Clendinning et al. | 47/37 X |

OTHER PUBLICATIONS

Crazing, Ency. Poly. Sci. Techn., vol. 4, Raetz, 1966, pp. 294–307.
Proc. N. Amer. Containerized for Tree Sdlg. Symposium, Tinus et al., Aug. 1974, Gt. Plains Ag. Council Publ. No. 68, pp. 241–254.

*Primary Examiner*—Robert E. Bagwill
*Attorney, Agent, or Firm*—Lloyd E. Hessenaur, Jr.

[57] ABSTRACT

A plastic container for planting tree seedlings in a mechanized process, and being in the shape of a projectile suitable for penetration into soil. The planting container is highly oriented in its longitudinal direction with a number of longitudinal grooves positioned on the inside, outside or both sides thereof. The grooves include slits and holes to permit drainage, egress of growing roots, and aiding in the self-destruction of the container after being injected into the ground with a seedling. The self-destruction can be further promoted by the use of stress cracking agents within the plastic material comprising the planting container.

6 Claims, 6 Drawing Figures

PLASTIC PLANTING CONTAINER

BACKGROUND OF THE INVENTION

Young plants and trees are commonly raised in containers from seeds planted in nursery soil and subsequently transplanted to a desired location. By the use of such containers transplanting shock can be eliminated and retention of nutrients and moisture within the confines of containers can be maintained for a period after field planting.

Such containers, which can be formed of plastic resin materials, also facilitate mechanized planting of the plants or trees as, for example, taught in Canadian Patent 694,803, and U.S. Pat. Nos. 3,517,629 and 3,736,889. In this approach a gun-like device implants the plastic container containing the seedling plant or tree in the ground. The problem encountered by this method is designing the plastic container or projectile so that it is strong enough to be driven into the ground and yet readily breakable once in the ground so that the seedling roots can be properly established in the soil.

The mere provision of slits or holes in the container, while permitting some root egress, will ultimately result in root strangulation unless it breaks apart or disintegrates. The incorporation of degradable materials in the plastic material of the container has yet not proven fully satisfactory. If the material is water degradable, the container will at least partially dissolve during irrigation in the nursery with the result that it has insufficient strength for transplanting. Where certain biodegradable compositions have worked reasonably well they have been generally too expensive for use in this application. If the plastic contains reasonably priced biodegradable concentrates, it tends to be degradable too fast in the nursery due to exposure to ultraviolet light, and too slow after planting.

Where other less expensive techniques have been used, such as using prestressed glass, it has been necessary for someone to come along after planting to fracture the container so that it would break into many pieces.

It is therefore among the objects of this invention to provide an improved economical planting container which will have adequate strength to be implanted by a gun-like device after sustaining the seedling in the nursery and, after implantation, self-destruct.

SUMMARY OF THE INVENTION

The objects of this invention have been achieved by providing a plastic container highly oriented in the longitudinal direction with numerous longitudinal grooves on the inside, outside or both sides of the container. Slits and holes on the side and near the bottom of the container have been added for drainage and initial egress of the seedling roots outside of the container after planting. The slits are elongated in the longitudinal direction, preferably are located in the grooves and terminate with pointed ends. The plastic material of the container can contain a stress-cracking agent in which the plastic container is immersed before it is planted into the ground. This provides a planting container which has sufficient strength for implantation yet can adequately self-destruct within a reasonable period of time to permit root growth of the plant or tree.

DETAILED DESCRIPTION OF THE EMBODIMENT

Figure 2:
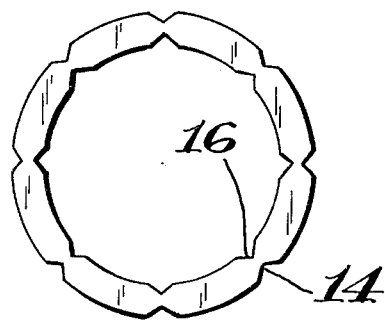
FIG. 2 is a top view thereof.
Figure 1:
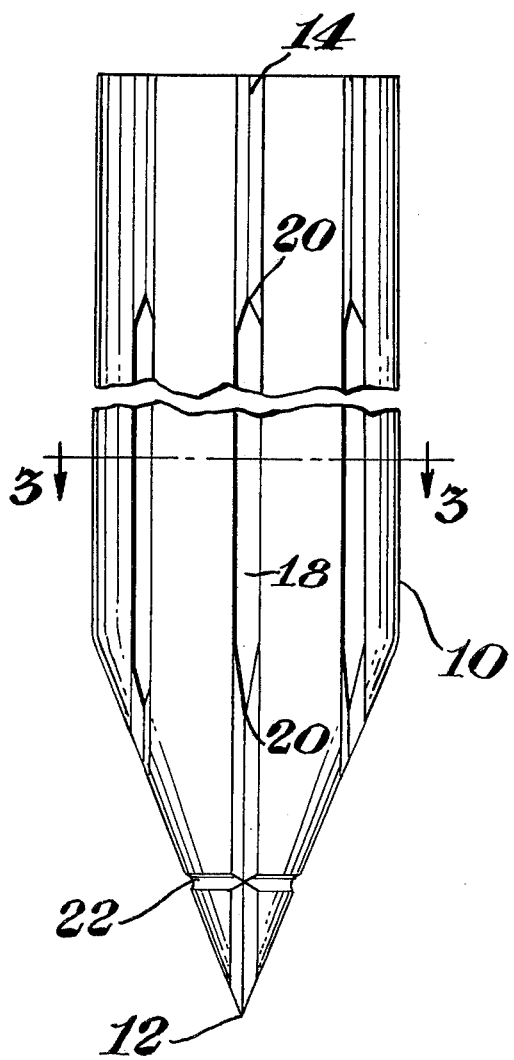
FIG. 1 is an elevational view of the planting container constructed according to the principles of this invention.

Planting container 10 for tree and plant seedlings is generally of projectile shape as shown in the embodiment of FIGS. 1 and 2. It is preferably several times longer than its width and at its planting end 12 is substantially pointed so as to permit easy penetration into the soil when fired from a gun-like device, not shown. About the inside, outside, or both sides of the periphery of the container 10 are located longitudinal grooves 14 and 16 formed substantially into the sidewall width of the container at several locations thereabout. Each of the grooves can contain a slit 18 along a substantial section of the length thereof, the grooves preferably having pointed ends 20. Drainage holes 22 can be included in or adjacent the planting end 12 of container 10.

This configuration of container 10 permits achieving of a high degree of orientation in its manufacture, which aids in implantation of the container as well as its subsequent self-destruction, as explained later. The container is preferably formed from a relatively inexpensive material, such as a general purpose polystyrene resin, which can be injection molded. Grooves 14 and 16 can be formed during the injection molding process by end gating the mold whereby the plastic is forced to flow longitudinally about such gates thereby inducing longitudinal orientation into the container. Such orientation, for example, can be greatly enhanced by injection molding of the plastic resin using low mold temperatures, low polymer temperatures, and high injection pressures. Grooves 14 and 16 provide a thinner side wall where hoop failure (in the direction transverse of the longitudinal direction of the container) can be more readily induced in the container 10 since there is little orientation in this transverse direction. The grooves are further weakened by the pointed end longitudinal slits. The pointed ends 18 and 20 tend to induce crack propagation and, in turn, break up the container in the growing process.

The strength imparted by the orientation along the longitudinal direction, however, will provide adequate strength for implanting the container when projected from a gun-like device into the ground.

To even further hasten crack propagation and, in turn, breaking of the container 10 in the ground, the container can be immersed in or otherwise impregnated with a stress-cracking agent, such as cotton seed oil, melted butter, butyric acid or butanol for polystyrene, before it is implanted in the ground. The stress-cracking characteristics of the plastic are thus promoted to increase the self-destruction capability of the container during the growing process of the plant or tree seedling. Suitable other stress-cracking agents can be used with polystyrene resin or as appropriate to the particular plastic resin used if other than polystyrene, as are well known in the art, although the prior art is primarily directed to reducing stress cracking rather than enhancing it for most container applications.

Figure 4:
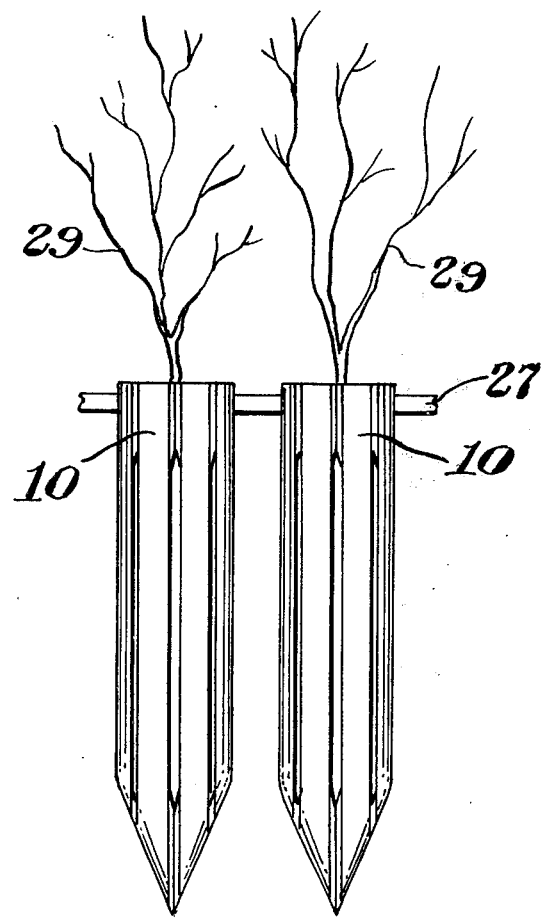
FIG. 4 is a group of the planting containers of FIGS. 1 to 3 supported by a frame.

FIG. 4 shows a plurality of containers 10 held together in a frame 27 and containing plant seedlings 29 in soil, and ready for implanting in the ground.

Figure 3:
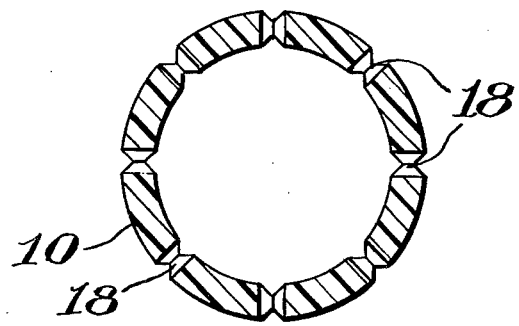
FIG. 3 is a cross-sectional view thereof taken along reference line 3—3 of FIG. 1.
Figure 6:
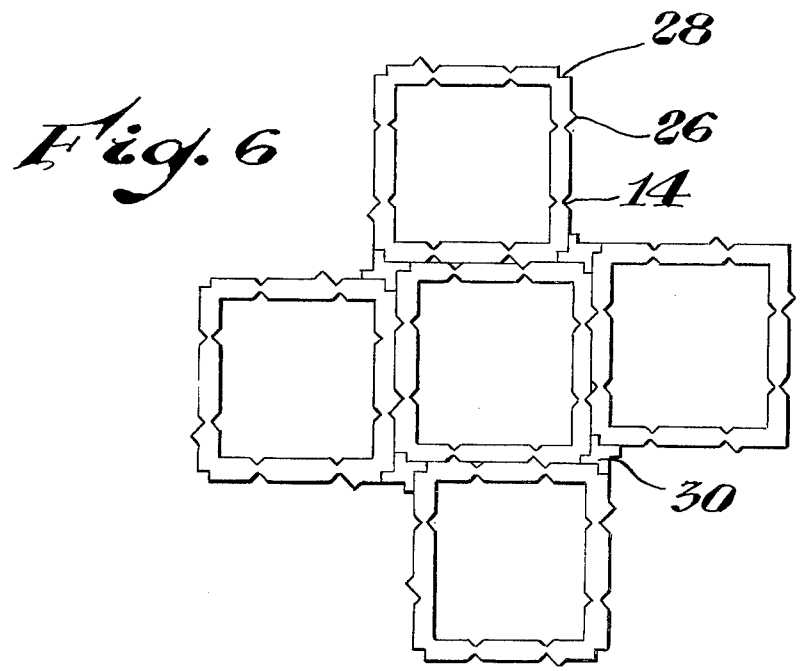
FIG. 6 is a top view of a group of packed planting containers like that shown in FIG. 5.
Figure 5:
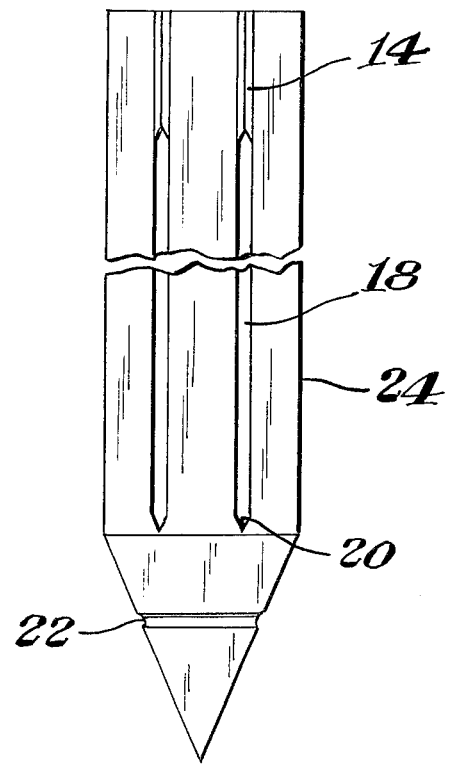
FIG. 5 is an elevational view of another embodiment of the planting container of this invention which is shaped to permit easy packing of a group of like containers.

The embodiment of FIGS. 5 and 6 is similar in many respects to that embodiment of FIGS. 1 to 3 and like reference characters have been applied to like features. This embodiment which comprises planting container 24, is different, however, in its cross-sectional configuration in that it is rectangular in cross-section instead of circular and includes side projections 26 and cut-out corners 28 for interlocking, respectively with groove 14 of another like container 24, and separate corner posts 30, the latter configured so as to mate with such corners 28. The interlocking is shown in more detail in FIG. 6. Each projection 26 is designed to mate with a groove 14 of another like container 24 and each corner 28 is adapted to fit with a post 30 located as may be desired in stacking a plurality of such containers in a pack. One side of such pack features a utilization of the container 24. Actual implanting into the soil of a container 24 with a tree or plant seedling and its subsequent self-destruction is substantially similar to that of container 10 previously described.

While certain representative embodiments and details have been shown for the purpose of illustrating the invention, it will be apparent to those skilled in the art that various changes and modifications can be made therein without departing from the spirit and scope of the invention.

Accordingly, what is claimed as new is:

1. An elongated thermoplastic planting container having one end generally pointed and an opposite end open for receiving soil and seedling, said container formed with substantial orientation strength in its longitudinal direction and with a lack of substantial orientation strength in the transverse direction, and a plurality of openings extending longitudinally along the container sidewall to further weaken the container in said transverse direction.

2. The planting container of claim 1 wherein the opposite ends of said opening are pointed.

3. The planting container of claim 1 wherein at least one hole is located adjacent the generally pointed end thereof to permit moisture evacuation and ingress, and root egress.

4. The planting container of claim 1 wherein the container is formed from a polystyrene resin material impregnated with a stress cracking agent to aid self-destruction thereof.

5. The planting container of claim 1 wherein the container is circular in cross-section.

6. The planting container of claim 1 wherein the container is rectangular in cross-section.

* * * * *